(No Model.) 2 Sheets—Sheet 1.

L. E. WATERMAN.
CULTIVATOR.

No. 579,936. Patented Mar. 30, 1897.

Witnesses
Franck L. Ourand
W. S. Boyd.

Inventor
Lewis E. Waterman
By John A. Manahan.
his Attorney (No Model.) 2 Sheets—Sheet 2.
L. E. WATERMAN.
CULTIVATOR.
No. 579,936. Patented Mar. 30, 1897.
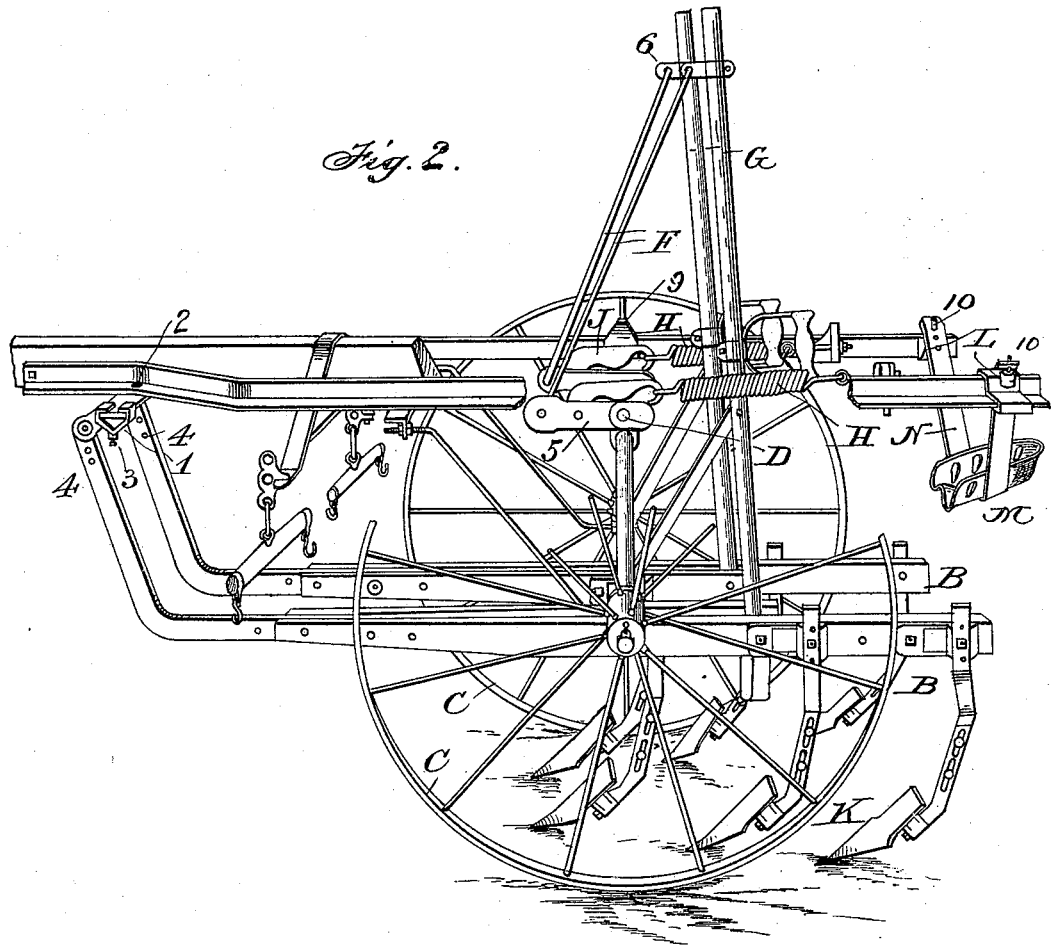
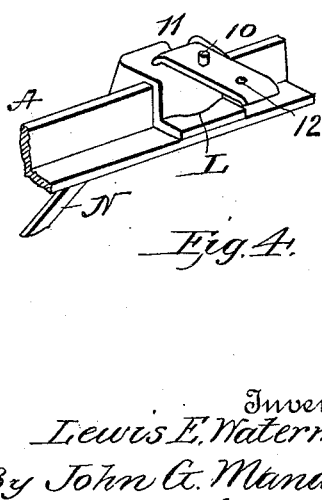
Witnesses
Franck L. Ouraud.
W. S. Boyd.
Inventor
Lewis E. Waterman
By John G. Manahan
his Attorney

UNITED STATES PATENT OFFICE.

LEWIS E. WATERMAN, OF MOLINE, ILLINOIS, ASSIGNOR TO THE ROCK ISLAND PLOW COMPANY, OF ROCK ISLAND, ILLINOIS.

CULTIVATOR.

SPECIFICATION forming part of Letters Patent No. 579,936, dated March 30, 1897.

Application filed September 5, 1896. Serial No. 604,952. (No model.)

*To all whom it may concern:*

Be it known that I, LEWIS E. WATERMAN, a citizen of the United States, residing at Moline, in the county of Rock Island and State of Illinois, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to that class of riding-cultivators primarily intended for the cultivation of corn, drawn by two horses, and known as "straddle-row" cultivators, from the fact that the rows of plants pass directly under the tongue and driver's seat and one carrying-wheel and shovel-beam passes between the rows of corn.

The purpose of my invention is to make provision for supporting the shovels adjustably at a predetermined depth and yet to permit the same to be readily forced deeper into the earth temporarily to cause the same to clean by increasing the friction thereon, to cast off accumulations, and in other contingencies; to provide a convenient method for supporting the shovel-beams when not in use and a ready mode of raising and lowering the same; to provide a convenient and efficient means for adjusting the shovels at different angles laterally, and to provide means for retaining the driver's seat at any desired location and yet render the same movable and free from longitudinal oscillation.

I attain the aforesaid and other objects hereinafter named by the construction illustrated in the accompanying drawings, in which—

Figure 1:
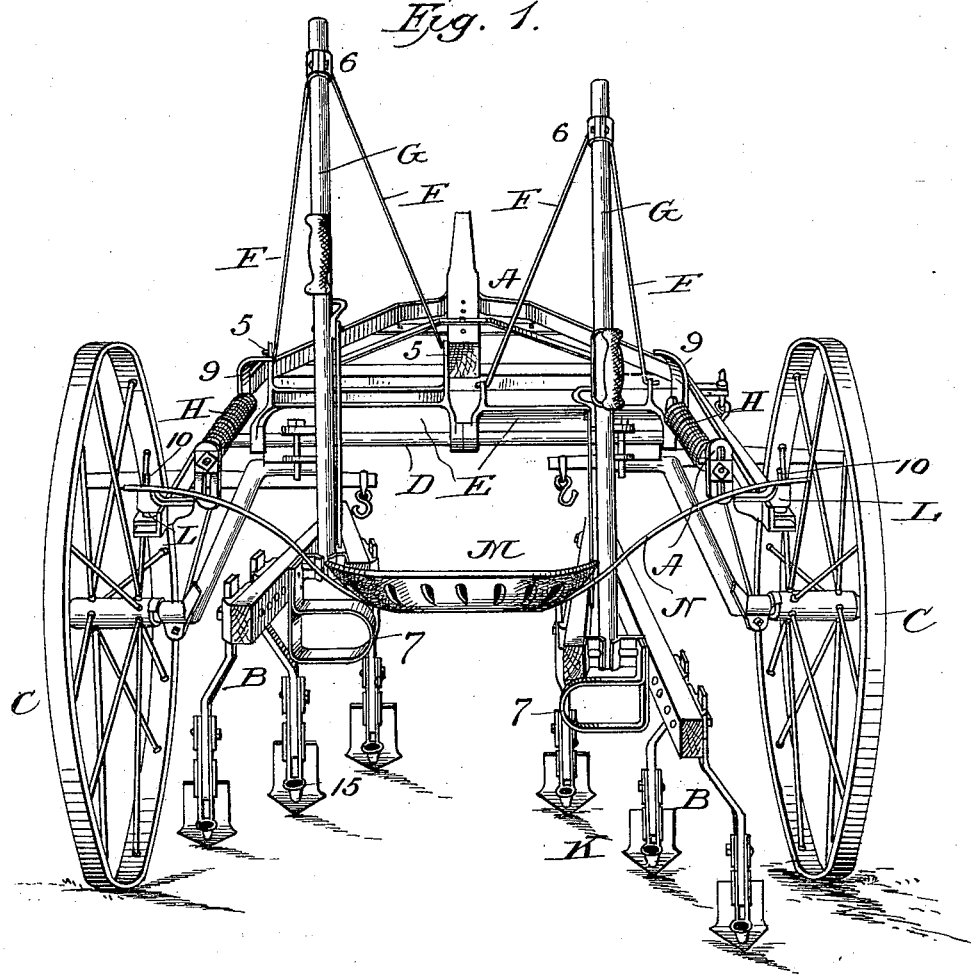
Figure 3:
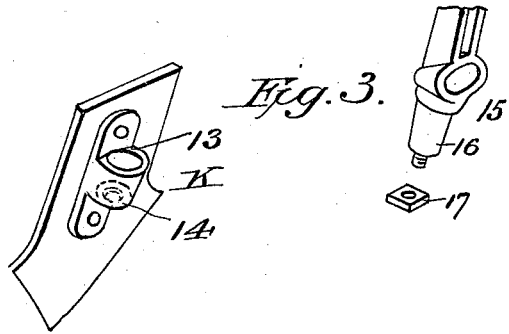

Figure 1 is a perspective, viewed from the rear, of a machine embodying my invention. Fig. 2 is a side elevation of the same with certain portions removed to more clearly exhibit the interior parts. Fig. 3 is a detail of the shovel-shank and the shovel, exhibiting the adjustable mode of seating the latter upon the former. Fig. 4 is a detail of the movable sleeves which suspend the driver's seat.

Similar letters and figures refer to similar parts throughout the several views.

A is the frame of the machine, which is open at its rear end.

B B are the cultivator-beams, pivoted vertically at their front ends by means of a movable sleeve 1 to the cross-bar 2, fastened transversely under the frame A a suitable distance forward of the carrying-wheels C. By means of a set-screw 3, seated in the sleeve 1, the latter can be readily adjusted laterally on the bar 2 to widen or narrow the space between the shovel-beams. A vertical series of openings 4 in the front end of the beam B, through which the latter are optionally pivoted to the sleeve 1, affords also a simple and ready vertical adjustment of the front end of the beam B. A transverse rod D constitutes the upper portion of the connecting-yoke or axle of the carrying-wheels C.

As the machine is constituted of duplex parts, one half thereof being substantially a counterpart of the other, it will be unnecessary to describe anything further than one set of said devices.

On one half of the transverse rod D there is seated a transverse bar E, parallel with said rod and loosely pivoted upon the latter at each end and adapted to have an orbital movement around the forward and upper portion of said rod D. At each end of the bar E there is formed a forwardly-projecting lug 5, to which the lower end of the diverging supports F are pivotally attached. The center portion of the support F passes through a clip 6, seated vertically adjustable on the mast G, which latter is rigidly seated at its lower end on the beam B. A horizontal coiled spring H is attached at its rear end to the frame A and at its forward end to a short arm J, which is virtually a forward prolongation of the spring H. The forward end of the arm J is pivotally connected to the bar E intermediate the attachment thereto of the supports F and the pivotal seat of said bar E on the transverse rod D. When the operator, by means of the foot-rest 7, has forced the beam B down to its working position, the lugs 5 will project forwardly slightly below the horizontal and the intermediate arm J will rest about centrally over the transverse rod D, also in a horizontal position, in condition to oscillate in a longitudinal vertical plane. As the rear end of the arm J is held by the spring H, in the further depression of the cultivator-beam B the said arm has a vertical rocking motion over its center bearing, which produces a cushion effect upon the vertical movement of the cultivator-beam, which, while it permits the further depression by the driver's foot of the beam D, returns the latter to its working position as soon as the excess pressure by the driver is terminated. The beam B is normally supported on the rocking center aforesaid of the arm J. This permits the shovels to run level and smoothly even when the wheels pass over uneven ground. When the bar E is thrown over forward in the working position of the shovels, the pivotal seat of said bar on the rod D, the attachment of the spring H to said bar, and the connection of the supports F to the lugs 5 on said bar are in such relation that the lugs 5 are slightly below the line of the other two connections named, whereby there results a lock of the parts, and the contractile force of the spring H is for the time inoperative to raise the beam B and has only the effect of imparting the aforesaid cushion quality or flexibility in a vertical plane to the said rocking arm J; but the instant the beam B is slightly raised by either the driver's foot in the rest 7 or a slight upward pressure in the handles 8, formed on the mast G, the aforesaid lock is broken and the spring H by its resiliency raises the beam B by drawing the lugs 5 on bar E into a vertical position back against the stop 9 on the frame of the machine, in which position the supports F are pushed upward and the shovels K suspended out of contact with the earth. As the pivotal seat of the bar E and the lower ends of the support F are now nearly in a vertical line with the upward pivoted portion of said supports, less tension of the spring H is required to hold the beam B in said elevated position.

On the rear ends of the frame A are seated sliding sleeves L, which can be readily moved fore and aft on the open projecting rear ends of the frame A, so as to bring the driver's seat M to or from the axle of the machine, as the variant weight of the driver may make desirable. On each of the sleeves L is formed a short vertical post 10 and a lateral horizontal recess 11.

A series of openings 12 in each of the seat-supports N furnishes ready means of adjusting the height of the seat M. It will be noticed that the seat M is swung comparatively low, so as to enable the driver to reach the surface of the ground with his feet and thereby remove any clods which may have fallen casually on the young plants. Where the driver's seat has but one pivotal bearing at each side, it is liable to longitudinal oscillation to a greater or less degree. This I avoid by forcing the rear edge of the seat-supports N into the recesses 11 formed inwardly from the post 10 on the sleeve L. Each outer end of the support N having, therefore, two removable engagements with the sleeve L the seat M is rigidly held and the objectionable oscillation avoided.

Referring to Fig. 3, there is centrally attached to the rear of the shovel K a socket 13, in form of an inverted truncated cone with an interior opening 14, tapering conformably to said socket and extending vertically through the latter. The shank 15 of the shovel K is formed near its lower portion into a tapering core 16, having an exterior conformable to the walls of the opening 14, but slightly greater in diameter than said opening. The lower end of the shank 15 is provided with the nut 17, by means of which said core 16 is drawn with a wedge-like action tightly within the opening 14. When the nut 17 is loosened, the shovel K can be turned laterally in either direction to any desired angle with the line of movement of the machine, and by tightening the nut 17 the shovel K is immovably held in said selected position.

The seating of the shovel K, involving both the screw quality of the nut 17 and the wedging quality of the core 16 within the socket 13, is absolutely immovable until the nut 17 is released.

All of the aforesaid parts are placed centrally behind the shovel A and therefore at no time interfere with the passage of the earth to and from the shovels, while the shovels are readily adjusted laterally from the slightest to the greatest degree. The socket 13 and core 16 may be formed on either the shank or shovel, respectively, with the same effect.

What I claim as my invention, and desire to secure by Letters Patent of the United States, is—

1. In a cultivator, the combination of the beam B, pivoted at its front end to the frame of the cultivator, the mast G seated rigidly on said beam, the swing-bar E, suitably pivoted at each end on said frame, and provided with forwardly-projecting lugs 5 support F pivotally attached at its lower ends in said lugs 5, and at its upper end pivotally attached to the mast G, the spring H attached at its rear end to the frame of the machine and at its front end to the arm J, the latter being pivotally connected to the bar E intermediate the pivotal seat of said bar and the attachment thereto of the support F, substantially as shown and for the purpose described.

2. In a cultivator, the combination of a shovel-beam B pivotally connected at its forward end to the frame of the machine and provided with a rigid, vertical mast, the swinging bar E pivotally seated on the frame of the machine and provided with forwardly-projecting lugs 5, a bifurcated support F, pivotally seated at its lower end in said lugs respectively, and pivotally attached at its upper end to said mast, a horizontal coiled spring attached to the frame of the machine in the rear of the bar E and connected to the latter through the medium of an intermediate horizontal arm J attached at its rear end to said spring and pivoted at its forward end to said bar E, intermediate the pivotal seat of the latter and the point of attachment thereto of the support F, said attachments to and of said bar E being so relatively arranged as that when the shovels are at work, said attachments shall be nearly or quite in a horizontal line, and said arm J will rest on the pivotal seat of said bar E also in a substantially horizontal position as and for the purpose described.

3. In a cultivator, the combination of a pivoted beam B a rocking bar E supporting said beam and a spring H so arranged in reference to said beam and bar that when the beam is in its normal working position, the contraction of said spring is substantially against the pivotal seat of said bar E, while as said beam is raised, the action of said spring is over said pivotal seat of said bar, substantially as shown and for the purpose described.

4. The combination of the beam B provided with the shanks 15 and shovel K and pivoted at its forward end, the mast G rigidly seated on said beam and supported and supporting said beam adjustably from the frame of the machine, the top of said mast traveling in the arc of a circle, the center of which is the forward pivot of said beam, and means substantially as shown for raising and lowering said mast.

5. The combination, with a frame, of shovel-beams pivotally secured thereto at their forward ends, a mast secured to each of said beams, a vertically-movable support for the mast, a spring for normally holding said support and mast in an elevated position, and means for varying the tension of the spring as the beam is depressed, substantially as set forth.

6. The combination, with a frame, of shovel-beams pivotally secured thereto at their forward ends, a mast secured to each of said beams, a vertically-movable support for the mast, an arm pivotally secured to the frame at the rear end and to the lower end of the support at the forward end, a spring connected with the arm intermediate its ends at its forward end and having its rear end connected with the frame at a point higher than the rear end of the arm, substantially as set forth.

7. In a cultivator, the combination of a frame A, sleeves L movable longitudinally thereon, and provided with a post 10 and recess 11, seat-supports N provided with openings 12 adapted to be optionally seated on post 10, while the edges of said supports are engaged and held in the recess 11 aforesaid, and a suitable seat M imposed on said supports, substantially as shown and for the purpose described.

In testimony whereof I affix my signature in presence of two witnesses.

LEWIS E. WATERMAN.

Witnesses:
FREDERICK A. HEAD,
J. T. FRANCIS.